(12) United States Patent
Grabelsky et al.

(10) Patent No.: US 7,480,723 B2
(45) Date of Patent: Jan. 20, 2009

(54) METHOD AND SYSTEM FOR PROVIDING DIRECTORY BASED SERVICES

(75) Inventors: David Grabelsky, Skokie, IL (US); Anoop Tripathi, Lake Zurich, IL (US); Michael Homeier, Elmhurst, IL (US); Sudhakar Ramakrishna, Lake Zurich, IL (US)

(73) Assignee: 3Com Corporation, Marlborough, MA (US)

( * ) Notice: Subject to any disclaimer, the term of this patent is extended or adjusted under 35 U.S.C. 154(b) by 309 days.

(21) Appl. No.: 10/409,294

(22) Filed: Apr. 8, 2003

(65) Prior Publication Data

US 2004/0249951 A1      Dec. 9, 2004

(51) Int. Cl.
G06F 15/16      (2006.01)

(52) U.S. Cl. .................. 709/228; 709/204; 709/227
(58) Field of Classification Search .......... 709/204, 709/227, 228; 370/352
See application file for complete search history.

(56) References Cited

U.S. PATENT DOCUMENTS

| | | | |
|---|---|---|---|
| 5,850,433 A | | 12/1998 | Rondeau |
| 5,896,321 A | * | 4/1999 | Miller et al. ............ 365/189.01 |
| 6,009,459 A | * | 12/1999 | Belfiore et al. .............. 709/203 |
| 6,614,899 B1 | * | 9/2003 | Sollee et al. ........... 379/218.01 |
| 7,002,973 B2 | * | 2/2006 | MeLampy et al. .......... 370/401 |
| 2001/0040886 A1 | * | 11/2001 | Jimenez et al. ............. 370/352 |
| 2002/0078153 A1 | * | 6/2002 | Chung et al. ................ 709/204 |
| 2002/0112073 A1 | * | 8/2002 | MeLampy et al. ........... 709/240 |
| 2002/0114318 A1 | * | 8/2002 | Rines .......................... 370/352 |
| 2002/0136206 A1 | * | 9/2002 | Gallant et al. ............... 370/352 |
| 2002/0138488 A1 | * | 9/2002 | Trivedi ......................... 707/10 |
| 2002/0194388 A1 | * | 12/2002 | Boloker et al. .............. 709/310 |
| 2003/0174826 A1 | * | 9/2003 | Hesse ..................... 379/210.01 |
| 2004/0054658 A1 | * | 3/2004 | Spalink et al. ................. 707/3 |

OTHER PUBLICATIONS

*SIP:Sessions Initiation Protocol: Standards Track*; Rosenberg et al,.; RFC 3261, Jun. 2002.
*SIP: Session Intiation Protocol*, Enhancements For Authenticated Identity Management In the Session Initiation Protocol; J. Peterson, Aug. 2, 2003.
International Search Report for PCT/US04/10348.

* cited by examiner

*Primary Examiner*—William C Vaughn, Jr.
*Assistant Examiner*—Ranodhi N Serrao
(74) *Attorney, Agent, or Firm*—McDonnell Boehnen Hulbert & Berghoff LLP

(57) ABSTRACT

A method and system for providing directory based services is provided. The directory service may process an ambiguous destination identifier from a call-session request to multiple database entries in a directory server, and return an appropriately constructed response that can be interpreted by a user as a prompt for additional input to refine the destination identifier. The possible matches could be sent as a list of possible choices. The user can then select the desired match from the list and send a follow-on request including the selection to the directory server. Based on the selection, the directory server will then either send additional possible matches to the user or obtain a contact address corresponding to the selection. After resolving the ambiguous match to a unique destination identifier, a call can then be established.

13 Claims, 9 Drawing Sheets

METHOD AND SYSTEM FOR PROVIDING DIRECTORY BASED SERVICES

FIELD OF INVENTION

The present invention relates to directory based services and, more particularly, to a method and system of Session Initiation Protocol ("SIP") based directory services.

BACKGROUND

Internet protocol ("IP") telephony and IIP multimedia networks employ several protocols to setup and manage calls and sessions. One of the most widely adopted protocols for IP-based signaling is the Session Initiation Protocol ("SIP"). SIP is used, for example, for initiating new calls and sessions, manipulating call paths, and enabling the association of services with users regardless of their point of connection in the network. These are just a few areas of application of the SIP.

The increasing use of SIP has spurred development and introduction of numerous services with SIP interfaces for user and network access. This approach makes sense as the number of SIP-capable devices proliferates in IP networks. The use of SIP as an interface assures that a "customer" and a "server" can rely on a common and widely used method for exchanging information.

One general category of service relevant to SIP capabilities is directory services. SIP-based services, and other IP-signaling protocols, are generally lacking in methods for directory and directory-related services. For example, current SIP standards require that a destination identifier used in SIP messages must be an exact match to a specific identifier of the called party. This requirement eliminates the possibility of providing searches for ambiguous destination identifiers.

In particular, when a SIP message carries a destination identifier, such as a Uniform Resource Locator ("URL"), it must be an exact match to an identity or symbolic name that can be mapped to an IP address for a connection to occur. For example, the URL "John_Doe@3Com.com" used as the destination identifier in a SIP message must exactly match a character string that can be resolved, e.g., by a database lookup, to the routable IP address of the intended recipient. When the SIP message is received by a redirect server, the server resolves the message if an exact match to the destination identifier can be found in a mapping database, and responds to the sender with the proper routing information. If an exact match cannot be found, a response message is sent that indicates that the message is unroutable. Therefore, if a database lookup fails to yield an exact match to "John_Doe@3Com.com," the message would be deemed unroutable. This limits the utility of a SIP-based directory service to finding routes only when a caller (origin of the message) knows the exact destination identifier.

SUMMARY

In an exemplary embodiment, a method of resolving a call-session request is provided. The method includes receiving a call-session request that includes a partial destination identifier, which is insufficient to fully define a desired destination identifier. The method also includes determining possible matches of destination identifiers to the partial destination identifier. The method further includes sending a response that contains at least a portion of a list of the possible matches of destination identifiers. In this method, the call-session request may also include a search term that indicates additional information relating to the partial destination identifier. If a search term is included, the method may include, using the search term, selecting a destination identifier from the possible matches of destination identifiers.

In one exemplary embodiment, the method of resolving a call-session request includes resolving a session initiation protocol (SIP) destination identifier. This method includes receiving an initial request that includes an ambiguous request-uniform resource identifier (URI) that is insufficient to fully define a desired request-URI. The method also includes determining possible matches of request-URIs to the ambiguous request-URI, and sending an initial response that includes at least a portion of information indicative of the possible matches of request-URIs.

In another respect, the exemplary embodiment is a method of resolving a call-session request that includes sending a call-session request, which has a partial destination identifier that is insufficient to fully define a desired destination identifier. This method also includes receiving a response that contains at least a portion of a list of possible matches of destination identifiers to the partial destination identifier. This method further includes sending a follow-on request that includes a selection of a given entry from the list, and receiving a follow-on response that includes information indicative of the given entry. In this method, the call-session request may also include a search term that indicates additional information relating to the partial destination identifier. If the search term is included, the method may include, based on the search term, connecting to a device that has a destination identifier as defined by the desired request-URI.

In another respect, the exemplary embodiment may take the form of a directory server that includes a session initiation protocol (SIP) interface and a redirect server. The SIP interface may receive a SIP call-session request that includes a partial destination identifier, which is insufficient to fully define a desired destination identifier. The redirect server is coupled to the SIP interface and may access a database for possible matches of destination identifiers to the partial destination identifier. The redirect server may send a response to the request that contains at least a portion of a list of the possible matches of destination identifiers.

In still another respect, the exemplary embodiment may take the form of a user-agent application that includes a session initiation protocol (SIP) interface and a user interface. The SIP interface may send a call-session request that includes a partial destination identifier, which is insufficient to fully define a desired destination identifier. The SIP interface may further receive a response that contains at least a portion of a list of possible matches of destination identifiers to the partial destination identifier. The user interface may receive a selection of a given entry from the list by a user and direct the SIP interface to send the selection to request additional information of the given entry.

In the exemplary embodiment, the present invention provides enhancements and extensions to SIP to support transactions in which a destination identifier supplied by a requesting user or user agent may not be fully specified, or may be ambiguous with respect to possible matches maintained by a directory or location service. The transactions supported by the enhancements and extensions to SIP may include successive request-response communications between a requesting user or user agent and a directory server, one purpose of which is to resolve a partially-specified or ambiguous destination identifier to a routable network address, for example.

In the exemplary embodiment, the present invention also provides a directory service mechanism to allow SIP-based queries to supply a destination identifier which may be a partial or ambiguous match to entries in a list of one or more possible called party identifiers (e.g., URLs) stored in an associated directory database. This directory service can construct a SIP-based reply to such a query that provides all or some of the list entries. This enables the requester to process the returned list according to software methods on the requestor's user agent; e.g., the requestor can then select the desired called party identifier from the list. When implemented with standard SIP messages, including enhancements and extensions described herein, and with SIP-based network elements, such as SIP proxy servers, SIP redirect servers, and SIP user agents, this directory service enables a wide range of useful and versatile SIP-based directory services. By including intelligent user software on SIP user-agent end devices, user interfaces can be devised which interpret the lists returned by the SIP-based directory service, and provide the user such interactive capabilities as choosing one list entry to call, refining a search, or selecting several entries for a multicast. The directory service can be applied to both "white pages" and "yellow pages" directory services, for example. These are just a few of the ancillary services, features, and functions that could be enabled with the directory service described herein.

These as well as other features and advantages will become apparent to those of ordinary skill in the art by reading the following detailed description, with appropriate reference to the accompanying drawings.

BRIEF DESCRIPTION OF FIGURES

Exemplary embodiments of the present invention are described with reference to the following drawings, in which.

DETAILED DESCRIPTION OF EXEMPLARY EMBODIMENTS

In an exemplary embodiment, a user may send a call-session request message that contains a partial destination identifier to a directory server to determine a desired destination identifier. For example, the user may not know an exact destination identifier of a callee that the user wishes to call. Therefore, the user can simply send a partial destination identifier. The message is received by the directory server, which can access a database and determine all possible matches to the partial destination identifier. The directory server may then return to the user a list of the possible matches and the user can then select the destination identifier of the desired callee from the list, and subsequently establish an IP phone call.

Thus, the directory server can process an ambiguous match (i.e., matching the partial destination identifier to multiple database entries thus making the partial destination identifier ambiguous as to which match is correct), or a partial match to multiple database entries (i.e. matching the incomplete destination identifier to all possible complete matches), and return an appropriately constructed response that could be interpreted by the user as a prompt for additional input to refine the destination identifier. For example, a partial match of the destination identifier could yield a list of possible choices as above, or could invoke a prompt to the user for additional search criteria. Combining a means for the list to be returned in a response, together with a user-agent device that incorporates an interface for presenting the list and a prompt, would provide the basis for an interactive directory service.

Figure 1:
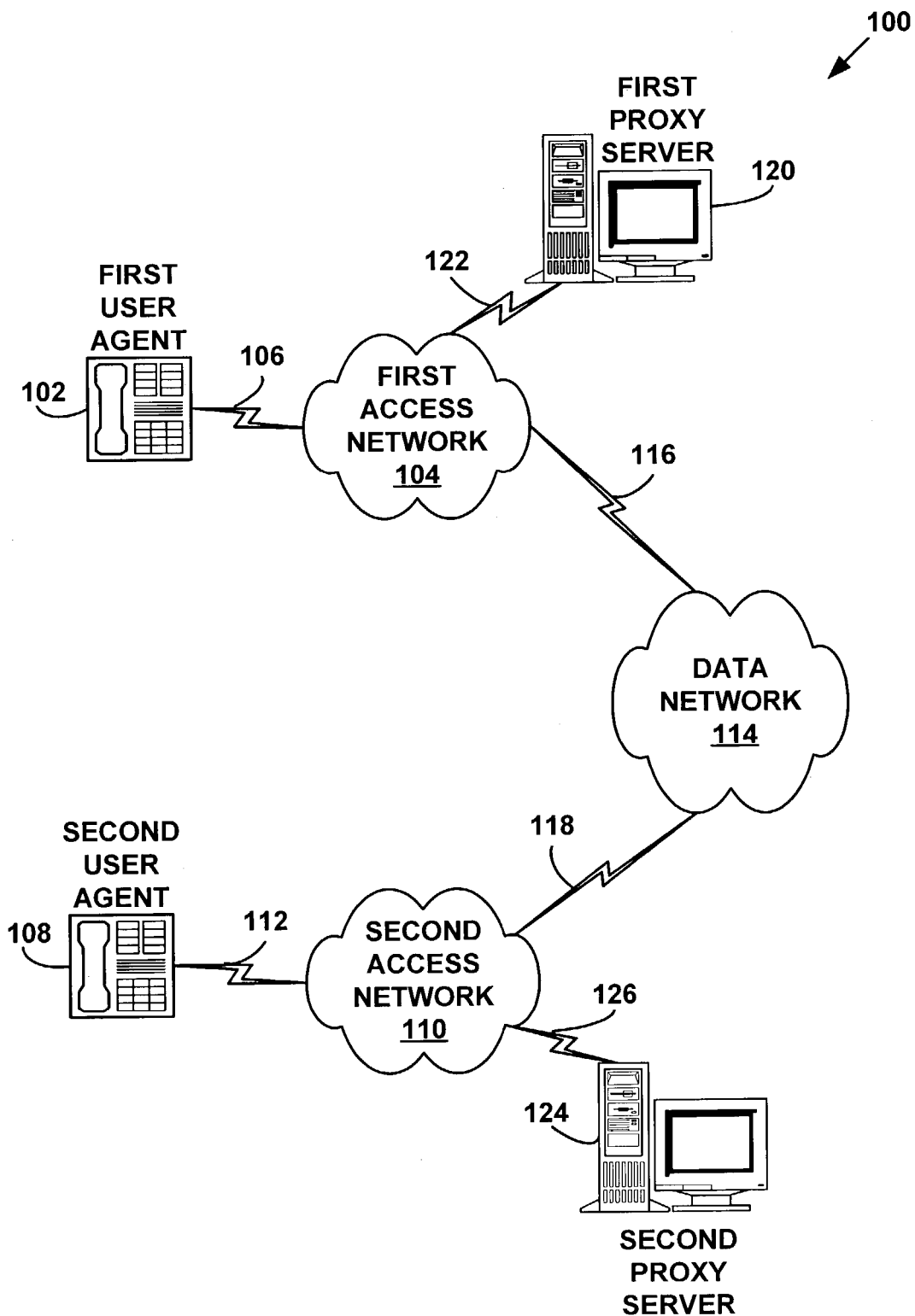
FIG. 1 is a block diagram illustrating one embodiment of a network telephony system according to the present invention.

Referring now to the figures, and more particularly to FIG. 1, a block diagram of one embodiment of a network telephony system 100 is illustrated. It should be understood that the system 100 illustrated in FIG. 1 and other arrangements described herein are set forth for purposes of example only, and other arrangements and elements can be used instead and some elements may be omitted altogether, depending, for example, on manufacturing and/or consumer preferences.

By way of example, the system 100 includes a first user agent 102 communicatively linked to a first access network 104 through a link 106. A second user agent 108 is linked to a second access network 110 through a link 112. Network entities on the first access network 104 may communicate with network entities on the second access network 110 through a data network 114, such as the public Internet or other transport network, linking the first access network 104 to the second access network 110 by links 116 and 118, respectively. A first proxy server 120 linked to the first access network 104 through link 122 and a second proxy server 124 linked to the second access network 110 through link 126 may be used to perform routing of signaling requests and responses. The links shown in the system 100 may be hard-wired or wireless links, and they may include intermediate network entities and/or networks. For example, the links 116 and 118 may contain various configurations of gateways and/or routers. In addition, the system 100 may also include other servers, such as registration servers, redirect servers, directory servers, and/or location servers. In addition, one or more of these server types may be combined into one physical device.

The first and second user agents 102 and 108 may be any devices that can communicate through the data network 114. In an exemplary embodiment, the user agents 102 and 108 are network phones. Although the user agents 102 and 108 are shown to be network phones, other implementations may also be used. For example, the user agents 102 and 108 may be a personal computer with software to perform SIP user agent functions, and user interface hardware, such as a microphone and headphone to serve as a means for communicating voice information. Other user interfaces, such as video and/or other types of communication data, may also be used, whether the devices use wired or wireless communication techniques. In addition, more user agents may be included in the system 100.

The first and second user agents 102 and 108 may receive calls from each other. In addition, they may receive calls from devices on other types of communication networks, such as from telephones located on the POTS (Plain Old Telephone System) when appropriate gateways are implemented in the system 100.

The first and second access networks 104 and 110 may be any type of networks that connect the user agents 102 and 108 to the data network 114. For example, the first and second access networks 104 and 110 may be wide area networks ("WAN"), local area networks ("LAN"), or others.

The first and second proxy servers 120 and 124 may be intermediate devices that receive requests from the user agents 102 and 108 and then forward the request on the agent's behalf. For example, the first and second proxy servers 120 and 124 may receive SIP messages and forward them to the next SIP server in the network. The first and second proxy servers 120 and 124 can provide functions such as authentication, authorization, network access control, routing, reliable request retransmission, and security. The first and second proxy servers 120 and 124 can either be stateful or stateless. A stateful proxy holds information about the call during the entire time the call is up, while a stateless proxy processes a message without saving information contained in the message. Furthermore, the first and second proxy servers 120 and 124 can be either forking or non-forking. A forking proxy can, for example, ring several phones at once until somebody takes the call.

The system 100 may include other types of servers as well, such as a redirect server, a directory server, and a registrar server. Redirect servers may be used to process messages by sending back the address where a callee is reachable. Registrar servers are used to record an address and the associated IP address. A common use of a registrar server is for a user agent to notify the registrar where a particular destination can be reached for a specified amount of time. When a call request arrives for the particular destination as specified in the register, the proxy or redirect server handles the request accordingly.

The various network server types may be combined into a single server or may be co-located. Not all server types are needed to implement the various embodiments of the present invention. The communication services to be provided, or requested by a user, will determine which servers are present in the communication system. In the example illustrated in FIG. 1, only proxy servers are shown. The present invention may be implemented in systems of varying complexity, with different combinations of server types and quantities.

SIP Overview

In the exemplary embodiment, a signaling protocol used in the system 100 is the Session Initiation Protocol ("SIP") signaling protocol. SIP is described in Handley, et al., "SIP: Session Initiation Protocol," IETF (RFC) 2543, March 1999, which is entirely incorporated by reference herein, as if fully set forth in this description. The SIP is also described in Rosenberg et al., "SIP: Session Initiation Protocol," IETF (RFC) 3261, June 2002, the contents of which are fully incorporated herein by reference, as if fully set forth in this description. Other signaling protocols, such as H-323, MGCP, MEGACO, and other standard or proprietary techniques may alternatively be used.

The SIP describes how to set up Internet telephone calls, videoconferences, and other multimedia connections. SIP can establish two-party sessions (ordinary telephone calls), multiparty sessions (where everyone can hear and speak), and multicast sessions (one sender, many receivers). The sessions may contain audio, video, or data. SIP handles call setup, call management, and call termination. Other protocols, such as real time protocol ("RTP") are used for data transport. SIP is an application layer protocol and can run over the user datagram protocol ("UDP") or the transport control protocol ("TCP"), for example.

SIP supports a variety of services, including locating the callee, determining the callee's capabilities, and handling the mechanics of call setup and termination, for example. SIP defines telephone numbers as uniform resource locators ("URLs"), so that Web pages can contain them, allowing a click on a link to initiate a telephone call (similar to the mailto function that allows a click on a link to initiate a program to send an e-mail message). For example, John_Doe@3Com.com may represent a user named John at the host specified by the domain name system ("DNS") of 3Com. SIP URLs may also contain other addresses or actual telephone numbers.

The SIP protocol is a text-based protocol in which one party sends a message in American standard code for information interchange ("ASCII") text consisting of a method name on the first line, followed by additional lines containing headers for passing parameters. Many of the headers are taken from multipurpose Internet mail extensions ("MIME") to allow SIP to interwork with existing Internet applications.

As an example, consider the following exemplary text encoded message.

```
INVITE sip:user@biloxi.com SIP/2.0
Via: STP/2.0/UDP pc33.atlanta.com;branch=z9hG4bK776asdhds
Max-Forwards: 70
To: User <sip:user@biloxi.com>
From: Sender <sip:sender@atlanta.com>;tag=1928301774
Call-ID: a84b4c76e66710@pc33.atlanta.com
CSeq: 314159 INVITE
Contact: <sip:sender@pc33.atlanta.com>
Content-Type: application/sdp
Content-Length: 142
```

The first line of this text-encoded message contains the method name (e.g., INVITE). The lines that follow are a list of header fields. For example, the fields Via (describing the address at which the user is expecting to receive responses), To (contains a display name or SIP request-URI towards which the request was originally directed), From (contains a display name and a SIP request-URI that indicate the originator of the request), Call-ID (contains a globally unique identifier for this call), CSeq (a traditional sequence number), and Contact (contains a SIP request-URI that represents a direct route to contact the sender) are header fields. In addition, the From header also has a tag parameter containing a random string (e.g., 1928301774) that used for identification purposes.

Other example methods are provided below in Table 1.

TABLE 1

| METHOD | DESCRIPTION |
| --- | --- |
| INVITE | Request initiation of a session |
| ACK | Confirm that a session has been initiated |
| BYE | Request termination of a session |
| OPTIONS | Query a host about its capabilities |
| CANCEL | Cancel a pending request |
| REGISTER | Inform a redirection server about the user's current location |

Figure 2:
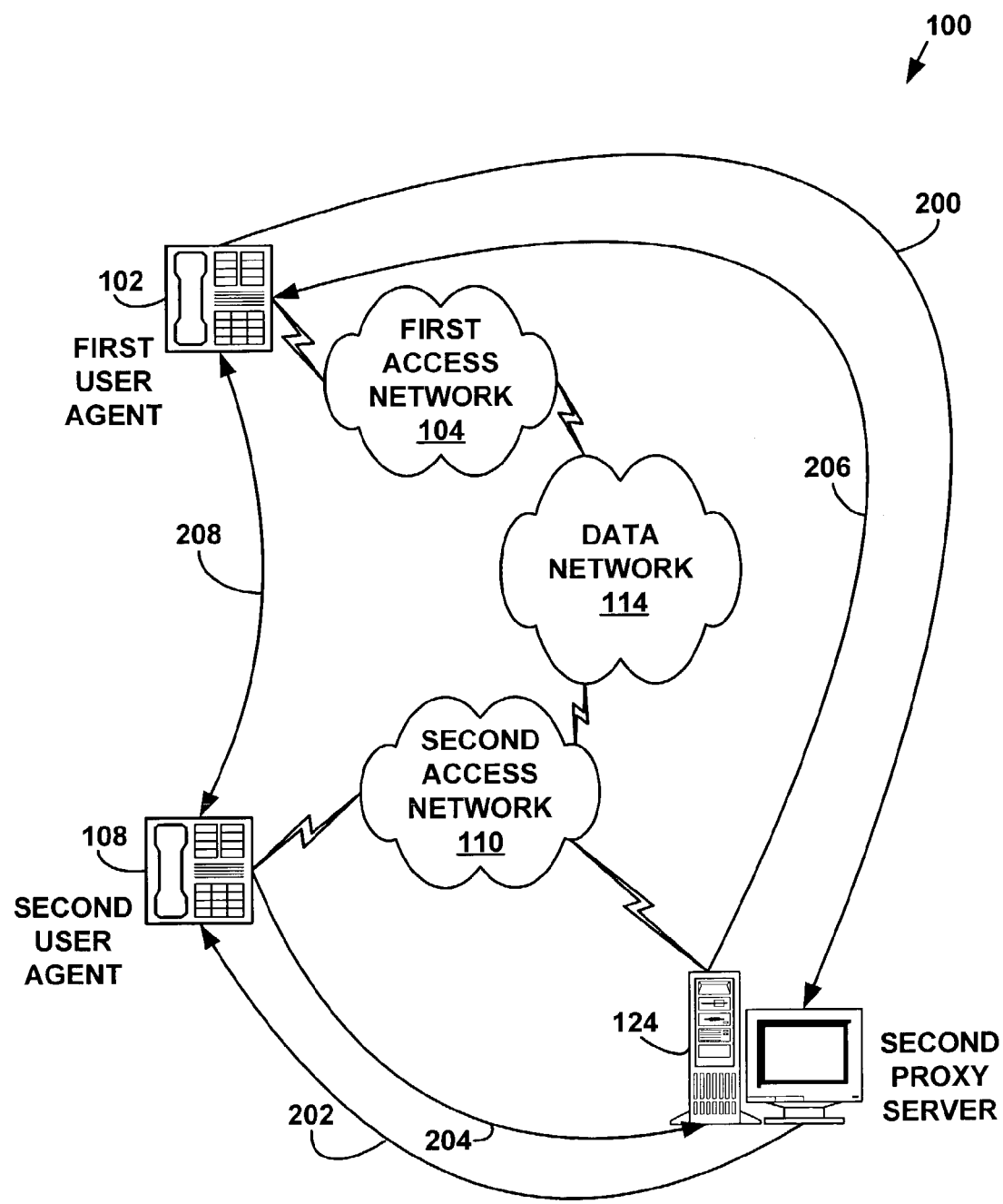
FIG. 2 is a simplified block diagram with message flow indicators illustrating a network telephony system according to an exemplary embodiment of the present invention.

FIG. 2 is a simplified block diagram with message flow indicators illustrating signaling within the network telephony system 100. For the example shown in FIG. 2, the SIP signaling protocol will be used. Other signaling protocols may also be used. The first proxy server 120 (and its associated link 122) are omitted for purposes of this illustration.

The first user agent 102 ("the caller") may call the second user agent 108 ("the callee"). To establish a call session, the caller sends an INVITE message 200 to the callee by way of the second proxy server 124. The transport protocol for the transmission may be TCP or UDP, for example. In both cases, the headers on the second and subsequent lines of INVITE message 200 describe the structure of the message body, which contains the caller's capabilities, media types, and formats. The INVITE message also contains a user identifier to identify the callee, a caller user identifier to identify the caller, and a session description that informs the called party what type of media the caller can accept and where the caller wishes the media data to be sent. User identifiers in SIP requests are known as SIP addresses. SIP addresses are referred to as SIP Universal Resource Indicators (SIP request-URIs), which are of the form sip: user@host.domain. Other addressing conventions may also be used.

The first user agent 102 transmits the INVITE message 200 to the second proxy server 124 located on the second access network 110. The second proxy server 124 will read the INVITE message and may use a location service locally or remotely located to itself to determine the location of the callee, as identified in the INVITE message 200. For example, the callee may have recently moved from one location to a second location (which may be on the second access network 110 or elsewhere). The second proxy server 124 determines the location of the callee by matching the SIP request-URI in the INVITE message to one within a location database, which may be within the second proxy server 124 or connected to the second proxy server 124. If the SIP request-URI in the INVITE message does not exactly match any in the database, the second proxy server 124 may simply ignore the message. However, as explained below, in an exemplary embodiment, the second proxy server 124 may perform directory service functions to resolve the unknown SIP request-URI.

When the second proxy server 124 determines that the callee is located at the second user agent 108, the second proxy server 124 transmits an INVITE request 202 to the second user agent 108. The INVITE request 202 may simply be a forwarded version of the INVITE request 200, containing the SIP addresses of the caller and the callee. Upon receiving the INVITE request 202, the second user agent 108 may transmit a response message 204 to the second proxy server 124. The second proxy server 124 may then transmit a response message 206 back to the first user agent 102.

The response messages may be reply codes. A reply code may be a three-digit number with a classification as defined below in Table 2.

TABLE 2

| CODE | MEANING | EXAMPLES |
| --- | --- | --- |
| 1xx | Information | 100 = server agrees to handle client's request |
| 2xx | Success | 200 = request succeeded |
| 3xx | Redirection | 301 = page moved |
| 4xx | Client Error | 403 = forbidden page |
| 5xx | Server Error | 500 = internal server error |

For example, if the callee accepts the call, the callee responds with a 200 OK message. Following the reply code line, the callee also may supply information about the callee's capabilities, media types, and formats.

If the transmitted response message 206 is a success response (i.e. represented by a SIP "200 OK" response), then first user agent 102 may send an ACK message (not shown) back to the second user agent 108 to confirm receipt of the 200 OK message and complete the call initiation process. The ACK message may be sent through the same path as the INVITE request and response messages, or the ACK message may be sent directly from the first user agent 102 to the second user agent 108 through the data network 114, bypassing the second proxy server 124. After the call has been initiated using the SIP signaling protocol, the call is connected and media data (including voice information, etc.) can flow on a data channel 208 between the first user agent 102 and the second user agent 108.

Other methods described in Table 1 can be used throughout the call session. For example, either party may request termination of a session by sending a message containing the BYE method. When the other side acknowledges the BYE method, the session is terminated. As another example, the OPTIONS method may also be used to query a user agent about its own capabilities. The OPTIONS method is typically used before a session is initiated to determine if that user agent is even capable of voice over Internet protocol ("VoIP"), or whatever type of session is being contemplated.

Furthermore, the REGISTER method relates to SIP's ability to track down and connect to a user whose location may not be associated with a single, fixed phone or client device. This message is sent to a SIP location server that keeps track of who is where. That server can later be queried to find the user's current location. The user agents 102 and 108 have pre-programmed device identifiers (e.g. phone numbers), represented as SIP request-URI's that are of the form sip: user@domain. An example is sip: 1234567890@sample-.com. After power-up, each of the user agents 102 and 108 may send a SIP REGISTER message to the default registrar. Referring back to FIG. 1, the default registrar for the first network phone 102 may be the first proxy server 120, while the second network phone 108 may register with the second proxy server 124. When a call arrives at the proxy server for any of the registered SIP request-URIs, the proxy server will forward the call to the appropriate destination. If a network phone is moved to a new location, all calls to the associated SIP request-URI will still be properly routed to that device. Alternatively, if a user moves to a different phone, that user may inform the proxy server of the location of the new phone, so that the user's SIP request-URI may be mapped to that new phone. In other words, the system 100 provides device mobility since calls will "follow" the network phone or the user according to the network phone's or user's SIP request-URI. This is useful if the network phone 102 or 108 is running the Dynamic Host Configuration Protocol ("DHCP") so that when the location is changed, the IP address is also automatically changed.

Referring back to FIG. 2, it is assumed that the caller knew the exact SIP request-URI of the callee. Therefore, the second proxy server 124 was able to establish the call since it could recognize the INVITE message 200 because the message contained information that was an exact match to that which the second proxy server 124 queried from a location or directory server. However, in many instances, the caller may not know an exact destination SIP request-URI.

Directory Services

Figure 3:
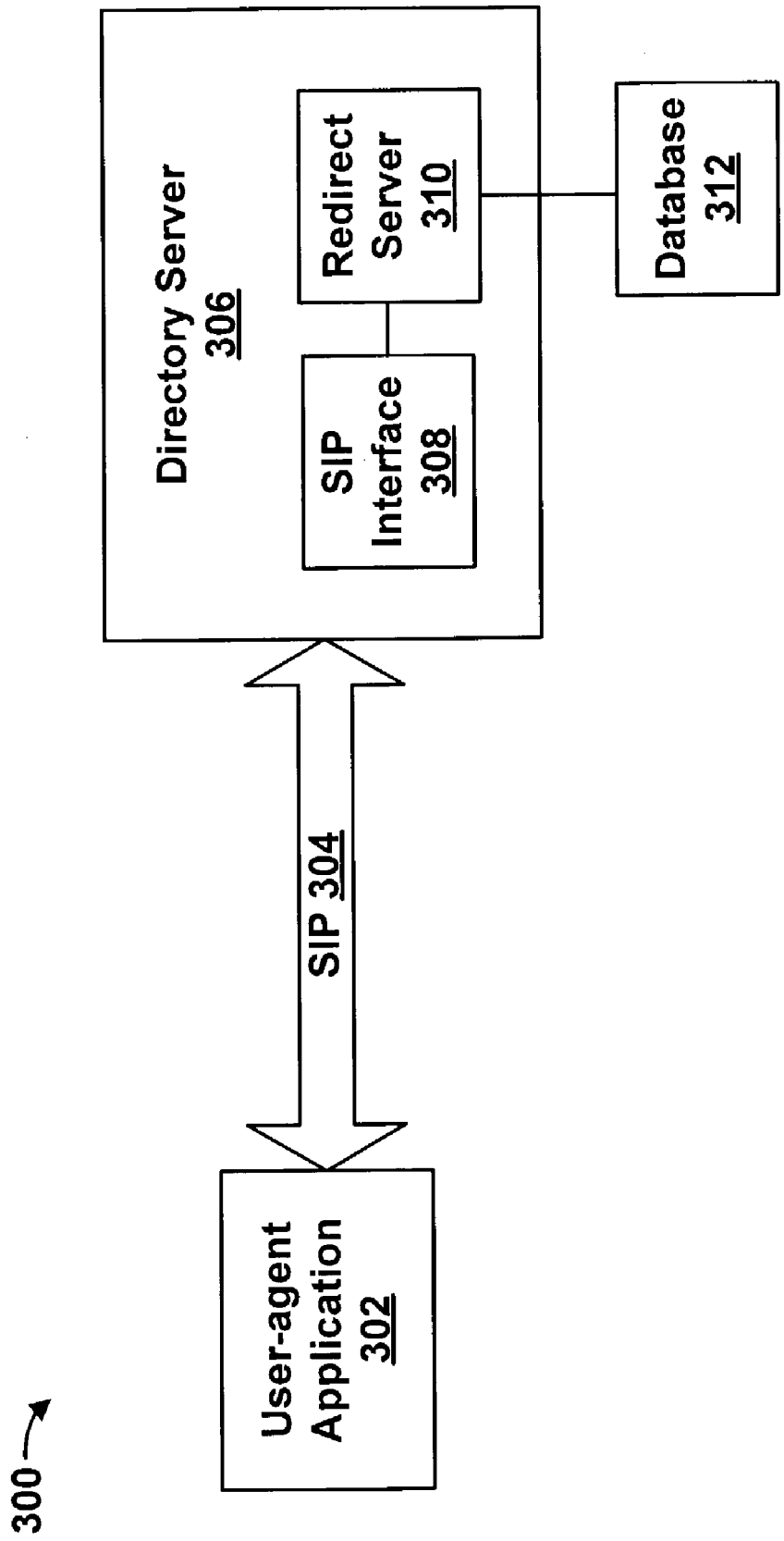
FIG. 3 illustrates one embodiment of a directory services system.

FIG. 3 illustrates a directory services system 300 capable of operation in a network that supports request-response transactions of the types supported by SIP with the enhancements and extensions described herein. The system 300 provides directory service functionality, including access to, and maintenance of, a directory database. The system 300 provides for directory service lookups, such as to determine a SIP request-URI from a partial SIP request-URI, in the event that a caller does not know the exact destination SIP request-URI, for example. In other words, the system 300 can determine possible matches to ambiguous destination identifiers (i.e., incomplete identifiers that match at least a portion of complete identifiers), such as SIP request-URIs, for example. An ambiguous destination identifier is ambiguous as to which complete identifier it was meant to match. The system 300 can also determine multiple matches to partial destination identifiers, such as incomplete SIP request-URIs that do not exactly match any portion of any complete identifiers. The terms partial destination identifier and ambiguous destination identifier are used interchangeably throughout this description, and neither is deemed limited to defining a specific type of destination identifier, since both terms can define multiple forms of destination identifiers. The system 300 illustrated includes a user-agent application 302 coupled via a SIP signaling link 304 to a directory server 306.

The user-agent application 302 initiates requests to the directory server 306 for directory service, and processes responses from the directory server 306. Requests may be for directory lookups, directory searches, or any other directory service, which may be accessed by one or more of the directory server's 306 external interfaces. An application component of the user-agent application 302 provides interactive capability to a requesting entity, which may be an end user or another application, such as an interactive voice recognition ("IVR") system, for example. The user-agent application 302 includes a SIP interface, along with the common capabilities of a SIP user agent.

The user agent application 302 resides at SIP end stations, (e.g., network phones), and contains two parts: a user agent client ("UAC"), which is responsible for issuing SIP requests, and a user agent server ("UAS"), which responds to such requests. The user agent application 302 may contain other components and may reside in other elements, such as personal computers. In particular, the user agent application 302 may reside in a network server, which provides SIP directory service access to end stations that do not themselves implement or support SIP.

The SIP signaling link 304 is a standard SIP link, which supports specific information content and formats required to support the directory services. For example, the SIP signaling link 304 may comprise access networks, a data network, and connections in between them, such as is illustrated in FIGS. 1 and 2.

The directory server 306 receives, processes, and responds to requests to read from and/or write to database entries. Common actions may include directory lookups (e.g., resolving a symbolic identifier into a routable address); directory searches (e.g., retrieving records which match some input criteria); and directory updates (e.g., adding new records, or modifying existing records). The directory server 306 includes a SIP interface 308 for communications with external SIP-enabled network elements, components, and devices. The directory server 306 may also provide other external interfaces to support alternative access methods such as hypertext transfer protocol ("HTTP") and voice extensible markup language ("VXML"), among others. The directory server 306 also includes a redirect server 310. The redirect server 310 may access a database 312 to perform the directory searches. Although the database 312 is illustrated separate from the directory server 306, the database 312 may be included within the directory server 306.

Figure 4:
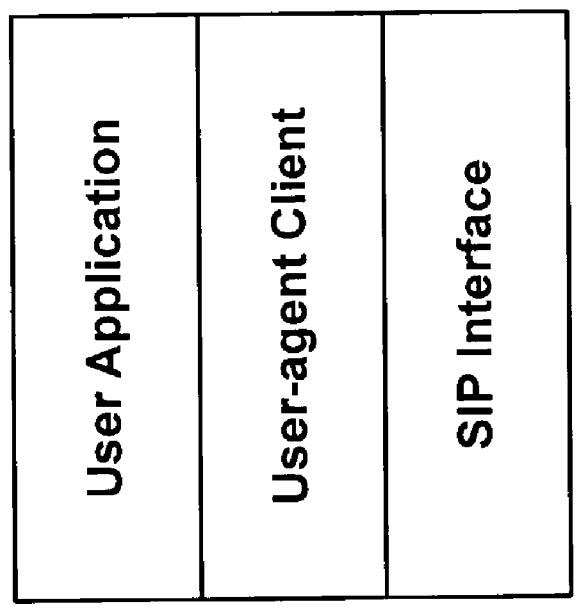
FIG. 4 illustrates one embodiment of a high-level architecture of a user-agent application.

FIG. 4 illustrates one embodiment of a high-level architecture of the user-agent application 302. The user-agent application 302 incorporates the intelligence to interpret and process user requests and directory server responses. The user-agent application 302 incorporates a user application with a user-agent client, which is responsible for issuing SIP requests. The user-agent application 302 also includes a SIP interface. The SIP interface connects the SIP user-agent client to external access. The user application could be a user interface for input and output with an end user. This provides an interactive capability for live end-users to enter queries, present results, and prompt for additional input based upon the results. Alternatively, the user application could be an interface to other service software in an IP multimedia network, such as audio input processing.

Furthermore, the user application could be an application server interface. This could support use of the user-agent application by application programs or software in order to layer additional services onto the directory services. For example, IVR capabilities could interact with the user-agent application 302 to provide voice-enabled directory services to the end-user. In this manner, the end-user would not interact directly with the user-agent application, but with the IVR server. Other services and capabilities associated with the user application are also possible.

Figure 5:
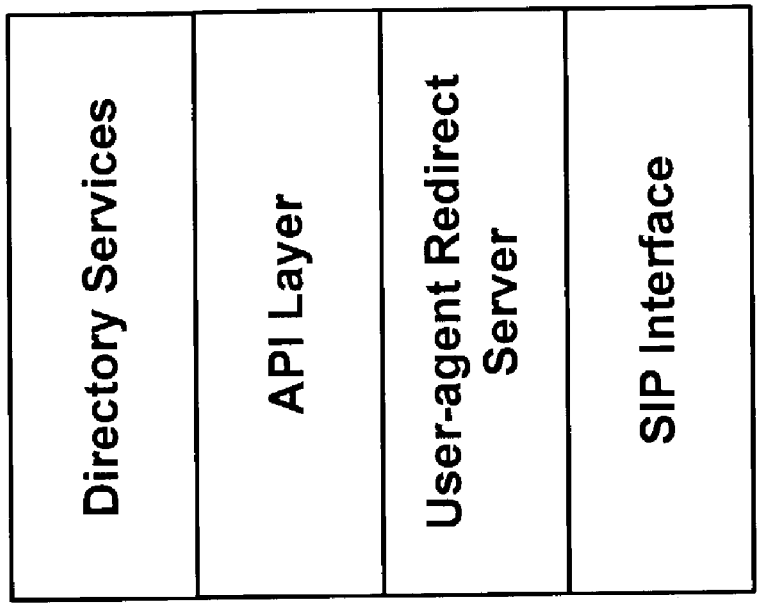
FIG. 5 illustrates one embodiment of a high level architecture of a directory server.

FIG. 5 illustrates one embodiment of a high level architecture of the directory server 306. The directory server 306 includes a SIP interface that connects a SIP redirect server to external access. Redirect server connects to the directory services infrastructure. This could be a database, a search engine, query processing software, or other directory services. The connections between the SIP redirect server and the directory services infrastructure could be internal, local, or remote. For example, FIG. 5 illustrates an application program interface ("API") layer.

In addition to the SIP interface, other external interfaces may be included in the directory server 306. For example, HTTP for web access could be used for provisioning and/or modifying entries in the database.

The directory services infrastructure incorporates the intelligence to interpret and process input requests, access the data, carry out searches, sort and/or filter search results, and formulate responses. For example, the directory services may provide security filtering. In addition, directory requests may only be honored if the requester is authenticated and authorized to receive the information that would result from processing the request. For example, a request for a directory lookup on "John_Doe@3Com.com" may only be honored if the requestor is authorized to view the directory database of 3Com.com. There may be other forms of security filtering as well.

The directory services may also provide the ability to modify database entries. Authorized users may wish to update database entries. For example, a user may update his/her yellow pages advertisements to reflect new information about special sales. The interface for this may be HTTP for web-based access. However, other access methods may also be possible, and other uses of database entry are also possible.

The directory services may also perform as a front-end for access to third-party search engines. This would allow a SIP-based query to the directory server to result in access to a third-party search engine. Moreover, the directory services could maintain address resolutions (or the equivalent information) for access to specific services. This could be instead of or in addition to contact information for end users or, e.g., businesses. For example, the database could contain address resolutions for SIP-enabled vending machines owned by a specific company, or on a particular campus. The service provided by contacting a vending machine could be a listing of its contents and the directory server could resolve a request-URI to a list of contact addresses for all vending machines, which satisfy some input search criteria. Other services and capabilities associated with directory services are also possible.

The system 300 provides for the usual capabilities of SIP and in addition, enhancements (and possible extensions) to SIP. The ability of the user-agent application 302 to specify the type or types of directory service(s) being requested in any particular SIP-based query to the directory server allows a user to perform specific searches. In addition, the ability of directory services to respond to a SIP-based query with data appropriate to the directory service requested in the query, including data which may be input to interactive functions at user-agent application provides for easy access to establish SIP based connections.

Resolving Call-Session Requests

Figure 6:
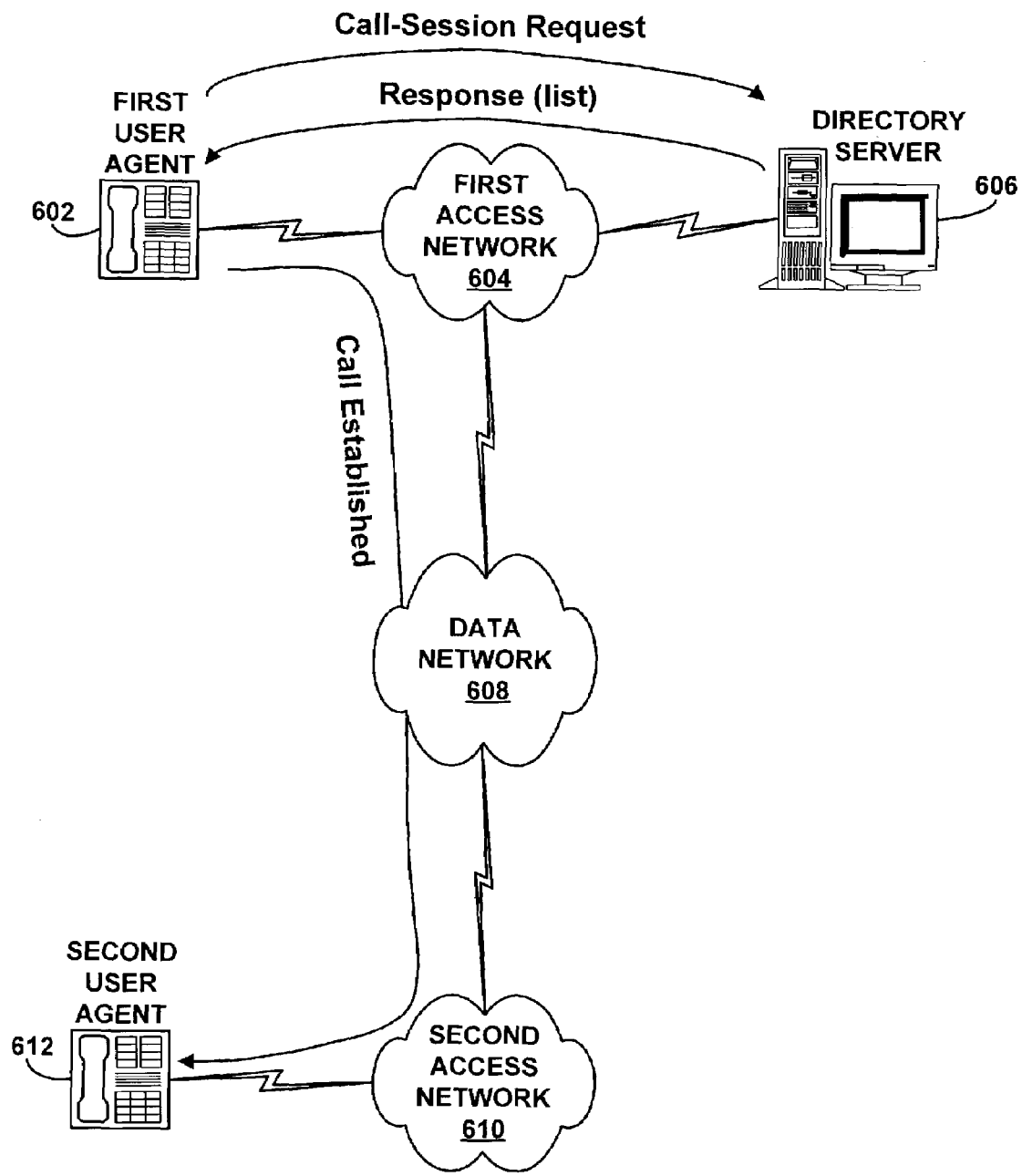
FIG. 6 illustrates one embodiment of a message flow within a directory services system.

In an exemplary embodiment, a directory services system resolves call-session requests for users. FIG. 6 illustrates one embodiment of a message flow within a direction services system. A first user agent 602 may desire to establish a call with a second user agent 612 or a user who has network access provided by the user agent 612, and thus may send a call-session request through a first access network 604 to a directory server 606. The call-session request includes a partial or ambiguous destination identifier, which is insufficient to fully define the second user agent's 612 destination identifier. For example, the partial destination identifier may be an ambiguous SIP request-URI, which does not fully define the second user agent's 612 SIP request-URI. In particular, the partial destination identifier may be "Jim@3Com.com," which does not fully define the SIP request-URI of a user named Jim Smith, who is located at the second user agent 612 (the full SIP request-URI might be, e.g., "Jim_Smith@3Com.com"). The directory server 606 may access a database (either locally or remotely) and determine possible matches of destination identifiers to the partial destination identifier, and send a response to the first user agent 602. The response contains a portion of a list of the possible matches of destination identifiers.

The first user-agent 602 will receive the response and make a selection from the list. If the second user agent's 612 destination identifier is not within the list, the first user-agent 602 will send a second request to the directory server 606 asking for more possible matches. However, if the second user agent's 612 destination identifier is within the list, the first user agent 602 may select that destination identifier. The selected destination identifier may then be sent to the directory server 606, which can then carry out a new lookup using the selected destination identifier, and provide the address mapping that allows for the call to be established through a data network 608 and a second access network 610. Alternatively, if the directory server 606 includes address mappings with its list of possible matching destination identifiers, including that of the second user-agent 612, the first user-agent 602 may select both the desired destination identifies and the associated address mapping without the need to communicate further with the directory server 606 for call setup assistance.

In the exemplary embodiment, the transaction for SIP-based directory services comprises an initial request from the first user-agent 602 to the directory server 606, followed by an initial response from the directory server 606 to the first user-agent application 602. Depending upon the nature of the initial transaction, a second transaction may be initiated by the first user-agent 602, including a second request and a corresponding second response. The second transaction may, in turn, be followed by a third transaction, and so on. For example, an initial transaction may be a directory lookup request that results in a list of choices sent in the response. A second request might then indicate a choice from the list, followed by a resolved address in the second response. The number of transactions associated with a call-session request may thus depend on the request type, and the complexity of the response. The end result is to obtain a response that yields a fully resolved destination identifier that can be used to initiate a call or a session, for example.

The transactions described above will be characterized as requests and responses, followed by follow-on requests and follow-on responses. It should be understood that there may be multiple follow-on transactions. In addition, it should be understood that these categories are defined for the convenience of describing the necessary enhancements and extensions, and are not themselves fundamental to the methods described. Furthermore, in some instances described below, no follow-on transactions may be necessary.

1. Initial Request

An initial call-session request is typically made before any session or call exists. Two SIP methods are suitable for the initial request: INVITE and OPTIONS. Within either method, a call-session request can be further categorized as implicit or explicit. An implicit request may contain all information required by the directory server 606 to understand the request. For example, a SIP INVITE containing a properly formatted request-URI would be interpreted by the directory server 606 as a usual lookup request. Note that this does not mean that results of the lookup must be an exact match.

An explicit request may contain some of the information required by the directory server 606 to understand the request, and may be contained within a SIP header, tag, or message body. For example, the initial request may include a header that alerts the directory server 606 that a search is requested based on a partial identifier. The header may also have a special request-URI that indicates that the message body contains search criteria. In addition, a tag may be used within a header field to differentiate a white pages search from a yellow pages search.

A message body of an initial request may be implemented with a Session Description Protocol ("SDP") to be used by the directory server 606 for pre-screening a search. If the directory server 606 finds multiple contact addresses for an input destination identifier (e.g., request-URI), the directory server 606 could select or prioritize the search results based upon the input SDP (this assumes, e.g., that SDP-like information is stored with the directory information, along with address resolution information).

The message body could also be a VXML message body containing encoded audio for voice-activated lookup and dialing. Other directory services that can accept audio input could also use this approach. Still other SIP options can be implemented, such as new SIP headers, tags, or message body types for the conveyance of information in directory services requests.

In some cases, there may be one or more requirements for security of a directory database or databases such that requests for access are limited to authorized requesters. Such a requirement(s) could apply to read access, write access, or both. For example, a request for a phone contact lookup at "3Com.com" may be limited to employees of the company associated with the "3Com.com" domain. In this case, the SIP requests should include methods for insuring this level of security.

In one embodiment, a user may be required to enter a personal identification number ("PIN") or a password for access to the directory database. This could be implemented by having the directory server's user-agent redirect server issue a challenge upon receiving a call-session request. Other implementations are also possible.

In another embodiment, a network asserted identity using a SIP proxy could be used, as specified in various IETF drafts (e.g., "Enhancements for Authenticated Identity Management in the Session Initiation Protocol (SIP)," J. Peterson, 2002, draft-ietf-sip-identity-00, the full disclosure of which is incorporated herein by reference). In this approach the user's SIP registrar (SIP proxy) vouches for the identity of the user, including this authenticated identity in the SIP INVITE to the directory server 606. This approach would be suitable, for example, where the identity of the user comprises sufficient security at the directory server 606 for access of authorized services. For example, if the directory server 606 at "3Com.com" recognizes "John Doe" as an authorized user, and the SIP INVITE includes a network asserted identity that verifies that the requestor is John Doe, then the security requirement is met, and the request can be processed. As with the challenge-based embodiment, there may be other ways to implement the network asserted identity approach as well.

While an initial call-session request is typically made before any session or call exists, it may also be possible to initiate some types of directory services requests from within an established session. In such cases, all of the enhancements that apply to the INVITE and OPTIONS methods would apply to any of the other SIP methods that could be used to support the types of advanced directory services discussed in this document.

2. Initial Response

A typical response to a call-session request is a contact header. This contains the resolution of a destination identifier (e.g., request-URI). A SIP 3XX response currently supports multiple contact headers for the purpose of providing multiple contact (resolved) addresses for the same intended message recipient, provided that the destination identifier can be completely and unambiguously matched with, e.g., an entry in a directory database. This may occur in the case, for example, in which "John_Doe@3Com.com" may be reachable at more than one location. Therefore, multiple contact headers could be sent in a response to a request to locate John Doe. If a request-URI resolves to several different partial or ambiguous matches, then a resulting list of contact headers would correspond to different potential recipients. Under current SIP operation, this occurrence would be considered an error, and reported as such to the requester in a 4XX response. However, such a list of multiple contact headers each referring to a different potential recipient may nevertheless be sent in a 3XX response. The methods described herein thus may utilize, for example, this form of 3XX response to convey the search results of the initial request in the initial response.

A header could be used to indicate that the response is one of a list of possible address resolutions. This would be an indication to the user-agent application that user input is required to select the desired choice from the list. For example, if a search for the request-URI "John@3Com.com" results in "John_Doe@3Com.com," "John_Deer@3Com.com," and "John_Moose@3Com.com," these could be returned in a list of the header type. The user could then select one (e.g., "John_Doe@3Com.com"), and return the selection to the directory server 606 in a follow-on request. The directory server 606 could then resolve the exactly-matching request-URI to a contact address, and send it back to the requestor.

In another embodiment, a tag may be used to associate a fully-matched request-URI with a corresponding contact header. In this case, the contact header of each of the unambiguous matches is returned in the response, each with a new tag that contains the corresponding request-URI. This allows the user-agent application to prompt for the desired choice according to the request-URI, and then forward the message using the associated contact header. That is, a follow-on request is not required for address resolution, since the message can be sent directly to the associated contact address.

These are just examples of how a new header and/or a new tag could be used to convey list information in a SIP 3XX response. Other uses are possible.

Use of a new header and/or tag may be sufficient for some directory services, such as returning lists, which require limited additional user input to complete a request. In other cases, more complex information may need to be sent in a directory server response. For example, information about a device's capability of the destination station may be required, or some additional information may be needed by the directory server 606 to refine a search. In these types of cases, it may become necessary to include this return data in the SIP message body.

The format of the message body in the initial response can be SDP, extensible markup language ("XML"), voice extensible markup language ("VXML") (e.g., VXML for audio prompting, which may be part of an IVR-type response), or any other currently defined format. In addition, any new format deemed necessary for support of directory services could also be used. For example, a directory hierarchy for narrowing a search could be implemented. The initial response may return a search category with several sub-categories. As another example, a pre-filtered SDP based on input SDP may be implemented. If the initial request included an SDP, the response may include an SDP that most closely matches the input. The user-agent application could then use the returned SDP in some application-specific manner. Other message bodies in a 3XX response for directory services may also be possible.

Note that it is still possible to have a directory service response that may use SIP without any of these enhancements. In particular, a lookup request that results in an immediate, exact match, and that yields a fully resolved address, may be handled using a typical 3XX response that supplies a contact header. This is equivalent to the type of simple redirect server function that can be implemented within the limitations of current SIP protocol usage. However, in the exemplary embodiment, more advanced directory services may require enhanced tags, headers, and message body implementations, or extensions to SIP such as new SIP methods (beyond those listed in Table 1).

3. Follow-on Request

A follow-on request is a request that uses information in a preceding response, together with input from the user-agent application (possibly supplied by an end user), to convey a new and/or refined directory services request. An example is a request that includes a selection from a list returned in a preceding response; this follow-on request refines the preceding search by choosing a specific selection.

A follow-on request may include similar types of enhancements (e.g., improved header, tag, message body), as the initial request. The only differences between follow-on and initial requests are the information transmitted to the directory server 606, the nature of the requests, and the ways in which the enhancements are used. For example, a follow-on request may include a selection of a destination identifier (e.g., request-URI) from a list in a preceding response; request for additional list entries when a list in a preceding response indicated further entries are available at the directory server 606; or a selection of a sub-category for a search when the preceding response contained a structured list of categories (e.g., a hierarchical structure). These represent only a partial list of the usage of follow-on requests. Others are possible.

4. Follow-on Response

A follow-on response is a response that is created and sent in response to a follow-on request. An example is a response containing a contact header corresponding to a destination identifier (e.g., request-URI) supplied in a follow-on request.

A follow-on response may contain similar types of enhancements (header, tag, message body) as in an initial response. The only differences between follow-on and initial responses may be the specific information transmitted to the user-agent application, the specific nature of the responses, and the specific ways in which the enhancements are used. For example, a follow-on response may contain a contact header that resolves the address of a destination identifier supplied in a preceding follow-on request; additional list entries in response to a preceding follow-on request; or a sub-category in response to a preceding follow-on request. These represent only a partial list of the usage of follow-on responses. Others are possible as well.

Enhancements Vs. Extensions to Sip

Within the above requests and response, examples using enhancements to an existing protocol are discussed. It should also be understood that it is possible to introduce new capabilities and uses of SIP by adding extensions to the protocol. Adding a method (cf., Table 1) that is not currently part of the standard would be considered an extension. SIP also defines message classes, such as 1XX, 2XX, 3XX, etc. These are used to convey information organized within predefined categories, e.g., errors, information, etc (cf., Table 2). Adding a message class that is not currently part of the standard would similarly be considered an extension.

Further, while explicit descriptions of specific extensions for enabling directory services are not included here, it should be understood that the approach of using extensions is considered within the scope of the exemplary embodiment.

Example Usage Scenarios

This section presents a few example usage scenarios for SIP-based directory services. These provide representative illustrations, and are not intended to comprise a complete set of all scenarios. It should be understood that others are possible as well.

1. User-Requested White Pages Lookup with Simple List Response

Figure 7:
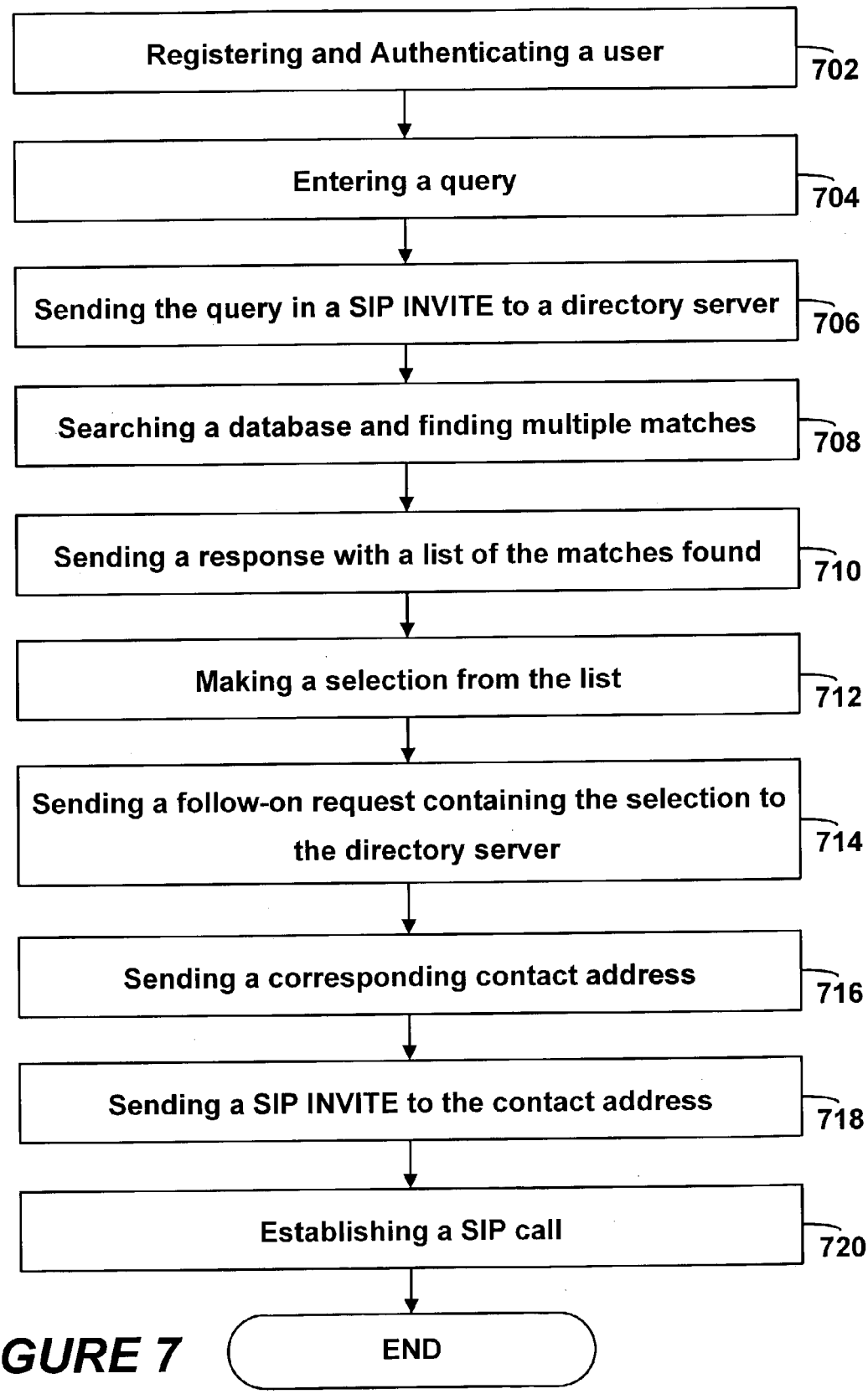
FIG. 7 is a flowchart depicting one embodiment of an example of the directory services for a user-requested white pages lookup with a simple list response.

In one embodiment, a directory request may yield a partial match with three entries in the directory database, all of which are returned at once in a single list. FIG. 7 is a flowchart depicting one embodiment of an example of the directory services for a user-requested white pages lookup with a simple list response. This is only one example illustrating one application of the directory services.

Initially, a user, e.g., Mabel LeMirb, an employee at ABC Corp. (domain name "abc.com"), registers with her SIP proxy server from her SIP phone and as part of this process, the SIP proxy server authenticates her identity, as shown at block 702. This will allow the SIP proxy server to include a network asserted identity as may be required by any future SIP transactions. Mabel then uses an interactive program on her SIP phone to find a phone number of Hiram Bimler, also an employee at ABC Corp by entering a query, as shown at block 704. However, she only enters "Hiram" in her query, possibly because she does not remember his last name. The program on her SIP phone creates a call-session request with a partial destination identifier, such as an INVITE with the request-URI "Hiram@abc.com." This request-URI is insufficient to fully define the destination identifier for Hiram Bimler because the request-URI is incomplete and possibly ambiguous, if more than one employee named Hiram works at the ABC Corp.

The SIP INVITE is then sent to her SIP proxy server and the SIP proxy server forwards the INVITE to the SIP-based directory server, as shown at block 706. Before forwarding the INVITE, the SIP user-agent redirect server at the directory server receives the INVITE and passes the request-URI to the directory services infrastructure, after first confirming that Mabel LeMirb is authorized to access the system. The user-agent redirect server accepts the network asserted identity in the INVITE as authentication. The directory database is then searched, and multiple possible matches are found, as shown at block 708. For example, "Hiram_Milber@ abc.com," "Hiram_Rimbel@abc.com," and "Hiram_Bimler@abc.com." Each match has a corresponding contact address, such as an IP address.

The user-agent redirect server at the directory server creates a 3XX-class response with a list of the three possible matches (e.g., full request-URIs) found, as shown at block 710. No contact addresses are included at this point. The 3XX response is sent back to Mabel's SIP phone via her SIP proxy server, as shown at block 710. The user-agent client on Mabel's phone extracts the list in the response and passes the list to an interactive directory query program. This program may display the list to the user, e.g., Mabel, and prompt her for a choice. The user may then select one of the destination identifiers from the list, as shown at block 712. Suppose Mabel chooses "Hiram_Bimler@abc.com." A follow-on request is then generated using the request-URI "Hiram_Bimler@abc.com." The follow-on request is sent as an INVITE to the directory server via Mabel's SIP proxy server, as shown at block 714

The request is processed (after a network asserted identity is accepted as authentication). This time, the fully-specified request-URI yields a unique match, and the corresponding contact address is returned in the 3XX-class response, as shown at block 716. This response is received at Mabel's SIP proxy server, which now forwards the INVITE directly to the contact address returned by the directory server, as shown at block 718. The call now proceeds as usual for a SIP call, as shown at block 720.

There are a number of alternative steps that could produce the same result in the above example, as well as alternative actions if the end result is intended to be other than an initiation of a call. For example, the fully-resolved contact address could be returned to Mabel's SIP phone for entry into a local phone list. Also, instead of returning the list of fully-specified request-URIs as shown at block 710, the directory server could have returned a list of each of the three contact addresses found, and included a new tag on each specifying the corresponding request-URI. For example:

Contact=124.24.25.6 (e.g., IP address); request-URI=Hiram_Milber@abc.com (e.g., tag)

Contact=124.24.25.54; request-URI=Hiram_Rimbel @ abc.com

Contact=124.24.214.83; request-URI=Hiram_Bimler@ abc.com

It should be understood that this example list represents only part of a response. In addition, a different tag name other than "request-URI" could be used for this purpose. With such a list, the interactive directory query program on Mabel's SIP phone can prompt her for the desired choice according to request-URI, and then construct a new SIP INVITE using the contact address included in the response. This would eliminate the follow-on request and response as shown at block 714. The rest of the steps could proceed as specified. Furthermore, the specific steps and their sequence are for illustration only. Other implementations of this service are possible as well.

2. User-Requested White Pages Lookup with Extended List Response

Figure 8:
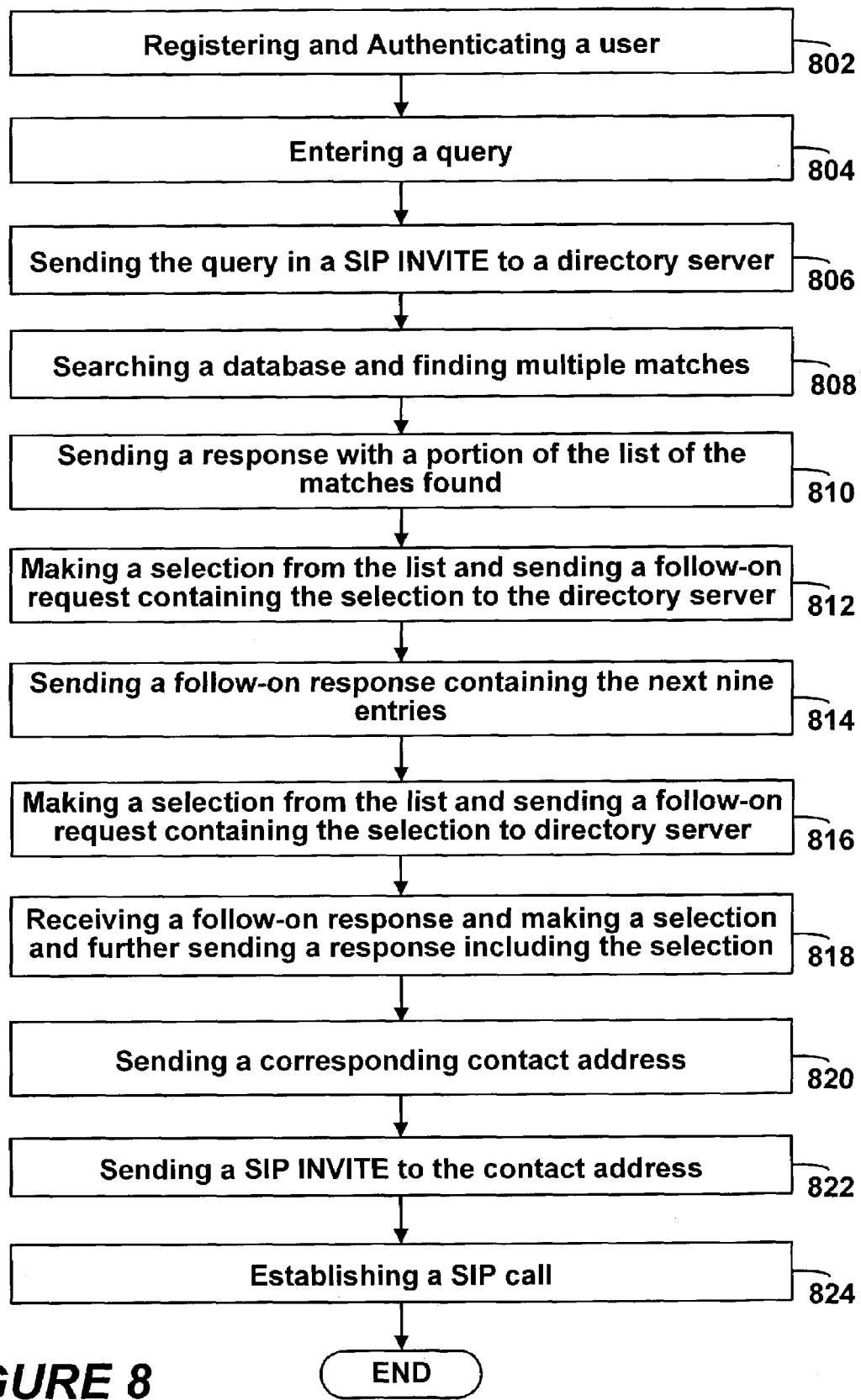
FIG. 8 is a flowchart depicting one embodiment of an example of the directory services for a user-requested white pages lookup with an extended list response.

In another embodiment, a directory request may yield a partial match with numerous entries in the directory database, only some of which are returned at once in a single list. In this example, a directory request yields a partial match with several entries in the directory database; too many to be returned in a single response (where the limit of "too many" may be a configurable according to the system, or according to the user's interactive directory query program, or both). The directory server prepares to return multiple, sequential installments of the total list in multiple responses, e.g., the initial response and some number of follow-on responses. The user may optionally terminate the process before the full list (all installments) has been returned. For example, if the desired selection is in the third of five possible installments, there may be no reason for the user to review the fourth and fifth installments. FIG. 8 is a flowchart depicting one embodiment of an example of the directory services for a user-requested white pages lookup with an extended list response.

Initially, the user, Mabel LeMirb, an employee at ABC Corp. (domain name "abc.com"), registers with her SIP proxy server from her SIP phone, and as part of this process, the SIP proxy server authenticates her identity, as shown at block 802. This will allow the SIP proxy server to include a network asserted identity as required by any future SIP transactions. Mabel uses an interactive program on her SIP phone to find a phone number of Carl LaFong, also an employee at ABC Corp by entering a query, as shown at block 804. However, she only enters "Ca" in her query, possibly because she does not remember how to spell his name. The program on her SIP phone creates a call-session request with a partial destination identifier that is insufficient to define a desired destination identifier. For example, an INVITE with the request-URI "Ca@abc.com" may be created. This INVITE is incomplete, however, it may match any number of destination identifiers.

The SIP INVITE is sent to her SIP proxy server and the SIP proxy server forwards the INVITE to the SIP-based directory server, as shown at block 806. Before forwarding the INVITE, the SIP user-agent redirect server at the directory server receives the INVITE and passes the request-URI to the directory services infrastructure, after first confirming that Mabel LeMirb is authorized to access the system. The user-agent redirect server accepts the network asserted identity in the INVITE as authentication. The directory database is then searched, and 45 possible matches to the desired destination identifier are found, as shown at block 808. For example, "Carol_Smith @ abc.com," "Carol_Jorgensen @ abc.com," "Carmen_Bobolinski @ abc.com," . . . "Carl_LaFong@abc.com," . . . "Carla_Appleburger@abc.com," and so on. Each possible match has a corresponding contact address.

The directory server is assumed for this example to be configured to return no more than 10 entries at one time in any given response, and the last (tenth) entry is a special entry which indicates a follow-on request for the next sub-list (if one exists). Thus, in this example, five successive responses will be required to return all 45 entries. Each response except the first will be a follow-on response to a follow-on request. Assume that "Carl_LaFong@abc.com" is the 35th entry. The user-agent redirect server at the directory server creates a 3XX-class response with a list of the first nine full request-URIs found. The tenth entry in the response list is a special request-URI that the directory server recognizes as request for the next nine list entries. For example, "Next-Directory-Entries@abc.com." No contact addresses may be included at this point. The initial 3XX response including a portion of the list of matches found is sent back to Mabel's SIP phone via her SIP proxy server, as shown at block 810.

The user-agent client on Mabel's phone extracts the list in the response and passes the list to the interactive directory query program. This program displays the list, and prompts the user for a choice. Mabel does not find the name she is looking for in this initial response, so she chooses an option for the next nine list elements, and a follow-on request is generated using the request-URI "Next-Directory-Entries@abc.com," as shown at block 812. The follow-on request is sent as an INVITE to the directory server via Mabel's SIP proxy server.

The follow-on request is processed (after a network asserted identity is accepted as authentication). A follow-on response is then sent to Mabel including the next nine entries, as shown at block 814. The user-agent client on Mabel's phone extracts the list in the response and passes the list to the interactive directory query program. This program displays the list, and prompts for a choice. Again, Mabel does not find the name she is looking for in this response, so she chooses an option for the next nine list elements and a follow-on request is generated using the request-URI "Next-Directory-Entries@abc.com," as shown at block 816.

On the third try (second follow-on response), the list contains "Carl_LaFong@abc.com." Mabel chooses "Carl_LaFong@abc.com," and a follow-on request is generated using the request-URI "Carl_LaFong@abc.com." This follow-on request is sent as an INVITE to the directory server via Mabel's SIP proxy server, as shown at block 818. The request is processed (after a network asserted identity is accepted as authentication). This time, the fully-specified request-URI yields a unique match, and the corresponding contact address is returned in the 3XX-class response, as shown at block 820. The directory server recognizes that the remaining two list installments of the possible matches to the initial request will not be needed, so they can be discarded.

The response is received at Mabel's SIP proxy server, which now forwards the INVITE directly to the contact address returned by the directory server, as shown at block 822. The call now proceeds as usual for a SIP call, as shown at block 824.

As with the previous example, there are number of alternative steps that could produce the same result in the above example, as well as alternative actions if the end result is intended to be other that initiation of a call. Also, as with the previous example, it should be understood that the specific steps and their sequence are for illustration purposes only. Other implementations of this service are possible as well.

3. User-Requested Yellow Pages Lookup with Structured List Response

Figure 9:
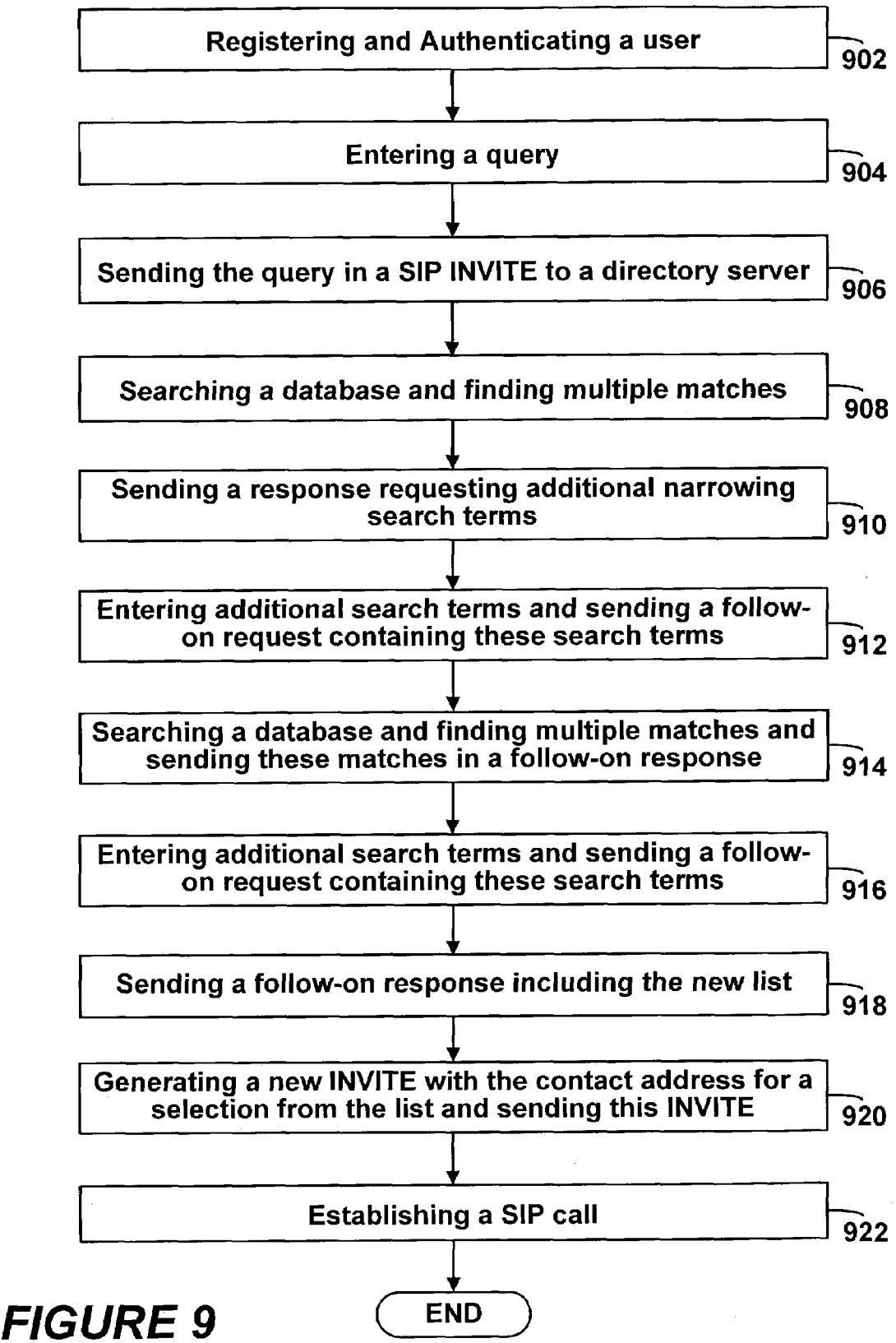
FIG. 9 is a flowchart depicting one embodiment of an example of the directory services for a user-requested yellow pages lookup with a structured list response.

In still another embodiment, a user may initiate a yellow pages search. In this example, multiple initial and follow-on request-response transactions may be executed until the user finds the desired information, and then a call setup may be optionally launched. FIG. 9 is a flowchart depicting one embodiment of an example of the directory services for a user-requested yellow pages lookup with a structured list response.

Trevor Pungle, a subscriber of All-Ways On Multimedia (domain name "allways.com"), an example interactive directory service, registers with his SIP proxy server from his SIP phone and as part of this process the SIP proxy server authenticates his identity, as shown at block 902. This will allow the SIP proxy server to include a network asserted identity as required by any future SIP transactions. Trevor uses an interactive program on his SIP phone to find a plumber listed in the All-Ways On yellow pages. He selects a yellow pages search, and enters "plumbers" in a query, as shown at block 904. The program on his SIP phone creates a call-session request with a destination identifier, such as a SIP INVITE with the request-URI "yellow_pages@allways.com." An XML body is also created which contains a field specifying "plumbers" as a search term or a search category, and a header is include which indicates the INVITE contains an XML body. The SIP proxy server includes a network asserted identity in the INVITE, which authenticates the requester as Trevor Pungle.

The SIP INVITE is sent to his SIP proxy server, which forwards the INVITE to the SIP-based directory server at allways.com, as shown at block 906. The SIP user-agent redirect server at the directory server receives the INVITE and passes the request-URI to the directory services infrastructure, after first confirming that Trevor Pungle is authorized to access the system. The user-agent redirect server accepts the network asserted identity in the INVITE as authentication.

The directory database is searched, and 3,847 entries are found in the category of plumbers for example, of which any of the entries could be possible matches to a desired plumber of Trevor, as shown at block 908. The directory server creates an XML body, which provides several default fields for narrowing the search. For example, location, name, hours of operation, additional keywords, etc., could be requested. The XML body is included in the 3XX response and a header is also included indicating the presence of the XML body. This initial 3XX response is sent back to Trevor's SIP phone via his SIP proxy server, as shown at block 910.

The user-agent client on Trevor's phone extracts the XML body in the response and passes the XML body to the interactive directory query program. This program uses the XML body to generate a query form in which some or all of the default fields may be entered. Suppose Trevor enters "Blentny, Ohio" as the location, and "licensed" as a keyword. A follow-on request is generated using the request-URI "yellow_pages@allways.com," and a new XML body and corresponding header are included, as well as a new header indicating that this is a follow-on request to a preceding response. This follow-on request is sent as an INVITE to the directory server via Trevor's SIP proxy server, as shown at block 912.

The request is processed (after a network asserted identity is accepted as authentication). The result is a list of sixteen licensed plumbers in Blentny, Ohio, for example. The list is returned in a new XML body in a follow-on response, as shown at block 914. The XML body could contain both the request-URIs and contact addresses for all sixteen plumbers. The user-agent client on Trevor's phone extracts the list in the response and passes the list to the interactive directory query program. This program displays the list, along with the option for entry of additional search criteria. Trevor enters a keyword, "heating and cooling." A new follow-on request is generated and sent to the directory server including this new search term as in the previous steps, as shown at block 916.

The request is processed (after a network asserted identity is accepted as authentication). Now, the result is a list of seven plumbers. The list is returned in a new XML body in a follow-on response, as shown at block 918. The XML body could contain both the request-URIs and contact addresses for all seven plumbers. The user-agent client on Trevor's phone extracts the list in the response and passes the list to the interactive directory query program. This program displays the list, along with the option for entry of additional search criteria. Suppose Trevor selects "U-bet Plumbing" from the list. Trevor's SIP phone generates a new INVITE with the contact address for U-bet Plumbing and sends this INVITE to his SIP proxy server, as shown at block 920. The call now proceeds as usual for a SIP call, as shown at block 922.

As with the previous examples, the specific steps and their sequence are for illustration purposes only since other implementations of this service are possible. For example, Allways On might make this service available to non-subscribers for a per-use fee. Also, there may be several other scenarios for the transactions.

In addition, user provisioning of the directory database could be accomplished using the method described above. For example, a vendor could update yellow pages entries and the updates could be included in a yellow pages database, and made available as part of the search criteria used by end users. This would allow vendors in the database to dynamically update information about their businesses in order to attract customers. Furthermore, service status updates to yellow pages entries could be made. These might allow automated services to update status information that could be made available as part of the search criteria used by end users. For example, an automated process on vending machines could update content information. Users could then search for vending machines based upon the content of a specific product (e.g., soda). The interface to the directory services database for such updates could be through a web-based provisioning tool, or could utilize the SIP enhancements described above. Alternatively, SIP extensions could be devised.

4. IVR Application Interface

Figure 10:
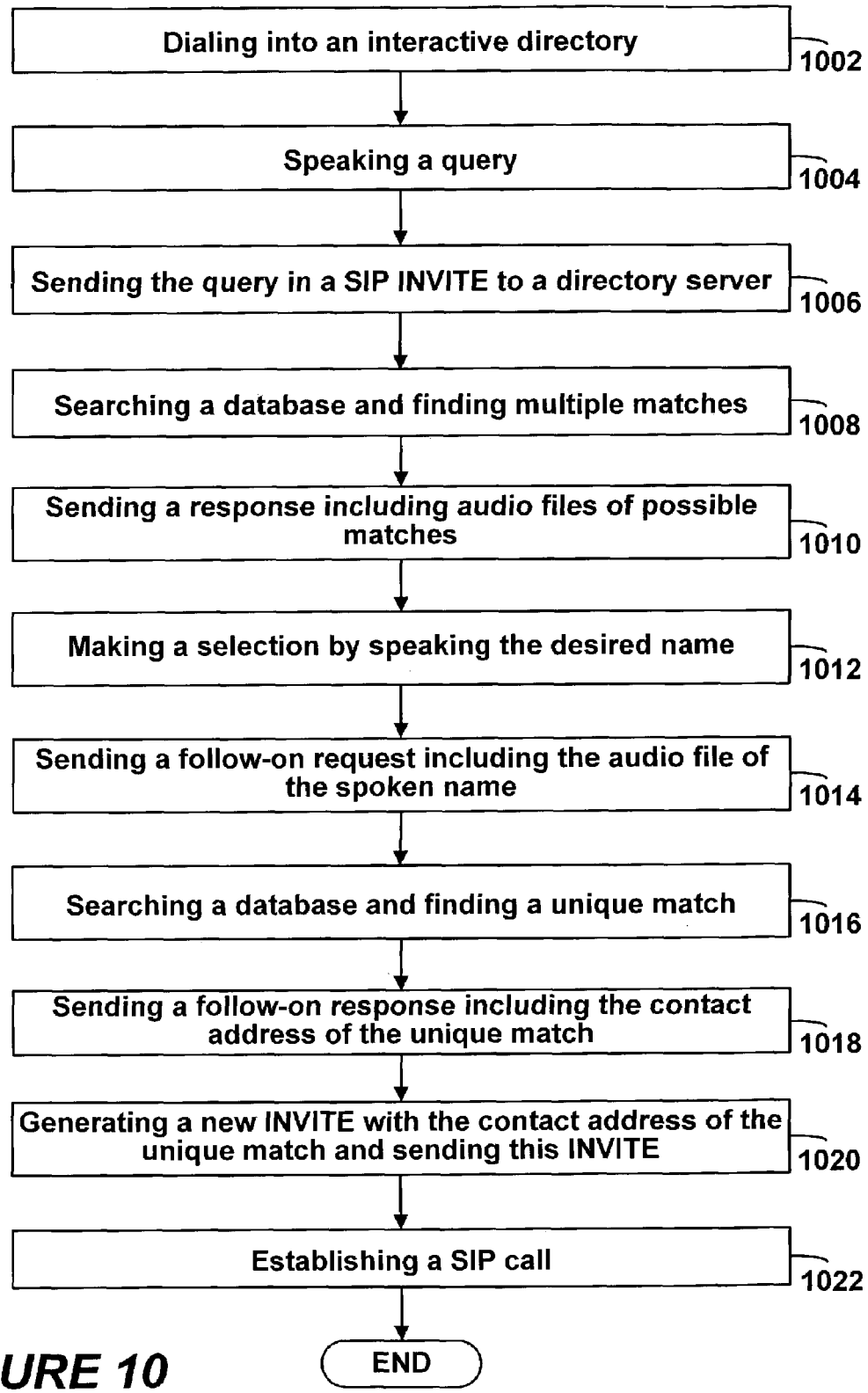
FIG. 10 is a flowchart depicting one embodiment of an example of the directory services for an interactive voice recognition application interface.

In yet another embodiment, a user may implement a directory services request through an IVR system. This example is similar to the first example, except here the directory services interface is based on an IVR front-end application. That is, the system includes a network-based user agent with a network-based user-agent application that provides IVR functionality for queries to the directory services. End users may access the IVR system via a landline phone (e.g., PSTN phone) and the SIP interactions can occur between the network-based user agent and the directory server (SIP phone users can also access the IVR system). FIG. 10 is a flowchart depicting one embodiment of an example of the directory services for an interactive voice recognition application interface.

Initially, a user, e.g., Mabel LeMirb, an employee at ABC Corp. (domain name "abc.com"), dials into the ABC Corp. interactive directory from her PSTN phone, as shown at block 1002. She is then prompted for a personal identification number ("PIN") that is used to authorize her access to the system. She enters her PIN, and the system plays a welcome message.

The IVR system prompts Mabel for a name to look up. She responds by speaking only "Hiram" into her phone possibly because she has forgotten his last name, as shown at block 1004. The IVR program captures her voice response in a digital audio file (e.g., a wave file), and passes the voice response to the network-based user agent, which may be co-resident on the IVR platform. The user agent creates an INVITE with the request-URI "Audio_Directory@abc.com." The SIP INVITE includes a VXML body with the digital audio file embedded, as well as a header indicating the presence of the VXML body.

The SIP INVITE is sent from the network-based user agent to the SIP-based directory server, as shown at block 1006. (A SIP proxy server could transfer the INVITE to the directory server, but it is assumed for this example that the network-based user agent is a trusted SIP endpoint of the directory server.) The SIP user-agent redirect server at the directory server receives the INVITE, and extracts the digital audio file from the VXML body. The SIP user agent redirect server then passes the digital audio file to an audio-based directory lookup program on the directory server. This program may store audio recordings of ABC Corp. employees speaking their names.

The audio directory database is searched for a match, and three partial matches are found, as shown at block 1008. A request-URI and a contact address along with an audio recording of the employee's name used in the matching, is associated with each match. The user-agent redirect server at the directory server creates a 3XX-class response with a VXML body that includes a digital audio file of each employee's spoken name. A header is included in the 3XX response that indicates the presence of the VXML body. The 3XX response is sent back to network-based user agent, as shown at block 1010.

The network-based user agent extracts the VXML body and the embedded digital audio files and passes them to the network-based user-agent application. Each is played back to Mabel in a concatenated recording that prompts her for her choice. For example, the playback may be as follows: "Three entries were found: Hiram Milber, Hiram Rimbel, and Hiram Bimler. Please speak the full name of the person you wish to select." The user then may make a selection by speaking the desired name, as shown at block 1612. Suppose Mabel speaks "Hiram Bimler." Again, the IVR program captures her voice response in a digital audio file, and passes the digital audio file to the network-based user agent. The user agent creates a new INVITE with the request-URI "Audio_Directory@abc.com." The SIP INVITE includes a VXML body with the digital audio file embedded, as well as a header indicating the presence of the VXML body. The INVITE is then sent to the directory server as a follow-on request, as shown at block 1014.

The SIP user-agent redirect server at the directory server receives the INVITE and extracts the digital audio file from the VXML body and passes the digital audio file to the audio-based directory lookup program on the directory server. The audio directory database is searched for a match, and this time a unique match to "Hiram Bimler" is found, as shown at block 1016. The directory server creates a 3XX response with the contact address for Hiram Bimler, and returns the 3XX response to the network-based user agent, as shown at block 1018. The 3XX response is used to generate an INVITE, which is sent to the contact address (possibly by way of a SIP proxy server), as shown at block 1020. The call now proceeds as usual for a SIP call as shown at block 1022, where it is assumed that a media gateway sits between Hiram Bimler's SIP phone and Mabel LeMirb's black (PSTN) phone.

As with the previous scenarios, there are number of alternative steps that could produce the same result, as well as alternative actions if the eventual task is intended to be other that initiation of a call. For example, the fully-resolved contact address could be returned to the network-based user agent, along with the VXML body and digital audio files. The selection prompt could ask for a number (e.g., DTMF digit) to choose the desired person. Then the final SIP INVITE could be constructed without requiring a follow-on request to the directory server. It should be understood that the specific steps and their sequence are for illustration purposes only. Other implementations of this service are possible as well.

While exemplary embodiments have been described, persons of skill in the art will appreciate that variations may be made without departure from the scope and spirit of the invention. The true scope and spirit of the invention is defined by the appended claims, which may be interpreted in light of the foregoing.

What is claimed is:

1. A method of resolving a session initiation protocol (SIP) destination identifier comprising:
   receiving an initial call-session request that includes an originating SIP request-uniform resource identifier (URI) indicating an originator of the initial call-session request, an ambiguous request URI indicating a party to which the initial call-session request is directed, the ambiguous request-URI being insufficient to fully define a desired request-URI, and a SIP header which indicates that a search for possible matches of request-URIs to the ambiguous request-URI is requested;
   determining possible matches of request-URIs to the ambiguous request-URI;
   sending an initial response, the initial response including at least a portion of information indicative of the possible matches of request-URIs, wherein the portion of information indicative of the possible matches of request-URIs is a list of contact Internet protocol (IP) addresses corresponding to the possible matches of request-URIs; and
   receiving a follow-on request that includes a selection of a given possible match to the ambiguous request-URI, wherein the follow-on request is recognized as a request for sending an additional portion of information indicative of the possible matches of request-URIs.

2. The method of claim 1, wherein the ambiguous request-URI indicates that a message body of the ambiguous request-URI contains search criteria.

3. The method of claim 1, wherein the ambiguous request-URI has an associated tag that contains search criteria.

4. The method of claim 1, wherein the initial call-session request includes a tag to indicate what type of search is requested.

5. The method of claim 1, wherein a message body of the initial call-session request is implemented with a service discovery protocol (SDP).

6. The method of claim 1, wherein a message body of the initial call-session request is a voice extensible markup language (VXML) message body that contains encoded audio for voice-activated lookup.

7. The method of claim 1, wherein sending the additional portion comprises sending a subsequent sub-list of possible matches of request-URIs.

8. The method of claim 1, further comprising sending a follow-on response that includes information indicative of the given possible match to the ambiguous request-URI.

9. The method of claim 8, further comprising:
   receiving subsequent follow-on requests; and
   responsively sending subsequent follow-on responses,
   wherein a given follow-on request includes a selection of an entry from a portion of the information that was sent in a previous follow-on response, and a given follow-on response includes information indicative of an entry from a previous follow-on request.

10. The method of claim 1, wherein the initial call-session request that further includes a search term being indicative of additional information relating to the ambiguous request-URI, and wherein the method further comprises using the search term, selecting a request-URIs from the possible matches of request-URIs.

11. The method of claim 10, further comprising establishing a call with the selected request-URI.

12. The method of claim 1, further comprising sending a subsequent follow-on response requesting a search term.

13. A method of resolving a session initiation protocol (SIP) destination identifier comprising:
- receiving an initial call-session request from a user-agent application that includes an originating SIP request-uniform request indicator (URI) indicating an originator of the initial call-session request, an ambiguous request URI indicating a party to which the initial call-session request is directed, the ambiguous request-URI being of the form user-name@domain-name and insufficient to fully define a desired request-URI, the initial call-session request further including a SIP header comprising a search term being indicative of additional information relating to the ambiguous request-URI;
- determining possible matches of request-URIs to the ambiguous request-URI using the search term;
- sending an initial response that includes a list of contact addresses corresponding to the possible matches of request-URIs;
- receiving a follow-on request that includes a selection of a given possible match to the ambiguous request-URI, wherein the follow-on request is recognized as a request for sending an additional list of contact addresses corresponding to the possible matches of request-URIs;
- receiving a selection of a given entry from the additional list of contact addresses;
- establishing a call between the requesting user-agent application and a user-agent application corresponding to the selected contact address.

* * * * *